United States Patent
Toifl et al.

(10) Patent No.: US 7,539,243 B1
(45) Date of Patent: May 26, 2009

(54) METHOD AND SYSTEM FOR LOW-POWER INTEGRATING DECISION FEEDBACK EQUALIZER WITH FAST SWITCHED-CAPACITOR FEED FORWARD PATH

(75) Inventors: Thomas H. Toifl, Zurich (CH); Martin Leo Schmatz, Rueschlikon (CH); Christian I. Menolfi, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,140

(22) Filed: Mar. 31, 2008

(51) Int. Cl.
- *H03H 7/38* (2006.01)
- *H03K 5/01* (2006.01)
- *H03L 5/00* (2006.01)

(52) U.S. Cl. .......... 375/229; 327/100; 327/111; 327/165; 327/311; 327/552; 327/554; 375/232; 375/233

(58) Field of Classification Search ......... 375/229–236; 327/101–108, 111, 165–169, 311–316, 321–323, 327/552–555

See application file for complete search history.

(56) References Cited

U.S. PATENT DOCUMENTS

| | | | |
|---|---|---|---|
| 4,870,657 | A | 9/1989 | Bergmans et al. |
| 6,441,843 | B1 | 8/2002 | Limberg |
| 6,504,412 | B1 * | 1/2003 | Vangal et al. ............ 327/203 |
| 7,130,366 | B2 | 10/2006 | Phanse et al. |
| 2005/0163207 | A1 | 7/2005 | Buckwalter et al. |
| 2006/0239341 | A1 | 10/2006 | Marlett et al. |
| 2008/0187037 | A1 * | 8/2008 | Bulzacchelli et al. ....... 375/233 |
| 2008/0198916 | A1 * | 8/2008 | Zeng et al. .................. 375/233 |

OTHER PUBLICATIONS

M. Park et al, "A 7Gb/s 9.3mW 2-Tap Current-Integrating DFE Receiver", ISSCC Dig. Tech. Papers, pp. 230-231, Feb. 2007.
C. Menolfi, T. Toifl, P. Buchmann, C. Hagleitner, M. Kossel, T. Morf, M. Schmatz, "A 16Gb/s Source-Series Terminated Transmitter in 65nm CMOS SOI", International Solid-State Circuits Conference (ISSCC) 2007, Feb. 2007.
Wu, Jich-Tsrong, "A 100-MHz Pipelined CMOS Comparator," IEEE Journal of Solid-State Circuits, vol. 23, No. 6, pp. 1379-1385 (Dec. 1988).

(Continued)

*Primary Examiner*—David C Payne
*Assistant Examiner*—Linda Wong
(74) *Attorney, Agent, or Firm*—Kenneth L. Sherman, Esq.; Michael Zarrabian, Esq.; Myers Dawes Andras Sherman, LLP

(57) ABSTRACT

A method and system for decision feedback equalization for digital transmission systems is provided. Low-power integrating decision feedback equalization with fast switched-capacitor paths are used, for suppressing intersymbol interference (ISI) due to past data symbols. The decision feedback equalization involves performing current-integrating decision feedback equalization at low-power employing a fast capacitively coupled feed-forward path at the output of a current-integrating buffer and inducing voltage changes by charge redistribution via coupled switching capacitors, and performing a voltage digital-to-analog conversation to determine a feedback coefficient as a coupling voltage. Then switches are reset to a pre-charge coupling voltage in the buffers to eliminate residual ISI caused by signal history, thereby achieving current integrating buffering with switched-capacitor feedback during the integration, and the capacitive switches are triggered by previous symbols.

1 Claim, 4 Drawing Sheets

OTHER PUBLICATIONS

T. Toifl, C. Menolfi, M. Ruegg, R. Reutemann, P. Buchmann, M. Kossel, T. Morf, J. Weiss, M. Schmatz, "A 22-Gb/s PAM-4 receiver in 90-nm CMOS SOI technology", IEEE Journal of Solid-State Circuits, vol. 41, Issue 4, Apr. 2006, pp. 954-965.

Choi, M. and Abidi, A., "A 6-b 1.3-Gsample/s A/D Converter in 0.35-μm CMOS," IEEE Journal of Solid-State Circuits, IEEE, vol. 36, No. 12, Dec. 2001, pp. 1847-1858.

Iroaga, E., & Murmann, B. (2007). "A 12-bit 75-MS/s Pipelined ADC using incomplete settling", IEEE Journal of Solid-State Circuit, 42 (4), 730-738.

R. Payne et al, "A 6.25Gb/s binary adaptive DFE with first post-cursor tap cancellation for serial backplane communiccations", ISSCC 2005.

A. Emami-Neyestanak et al., "A low-power receiver with switched-capacitor summation DFE", VLSI 2006.

T. Toifl, C. Menolfi, M. Ruegg, R. Reutemann, P. Buchmann, M. Kossel, T. Morf, J. Weiss, M. Schmatz, "A 0.94-ps-RMS-jitter 0.016-mm2 2.5-GHz multiphase generator PLL with 360° digitally programmable phase shift for 10-Gb/s serial links", IEEE Journal of Solid-State Circuits, vol. 40, Issue 12, Dec. 2005, pp. 2700-2712.

T. Toifl, C. Menolfi, P. Buchmann, C. Hagleitner, M. Kossel, T. Morf, M. Schmatz, "A 72mW 0.03mm2 Inductorless 40Gb/s CDR in 65nm SOI CMOS", International Solid-State Circuits Conference (ISSCC) 2007, Feb. 2007.

E. Prete, D. Sheideler, A. Sanders, "A 100mW 9.6Gb/s Transceiver in 90nm CMOS for Next-Generation Memory Interfaces," ISSCC Dig. Tech. Papers, vol. 49, pp. 88-89, Feb. 2006.

R. Palmer et al., "A 14mW 6.25Gb/s Transceiver in 90nm CMOS for Serial Chip-to-Chip Communication", ISSCC 2007.

B. Wicht, T. Nirschl, D. Schmitt-Landsiedel, "Yield and Speed Optimization of a Latch-Type Voltage Sense Amplifier", IEEE Journal of Solid-State Circuits, vol. 39, pp. 1148-1158, Jul. 2004.

P. Heydari and R. Mohanavelu, "Design of ultrahigh-speed low-voltage CMOS CML buffers and latches," IEEE Trans. Very Large Scale Integr. (VLSI) Syst., vol. 12, No. 10, pp. 1081-1093, Oct. 2004.

T. Chalvatzis et al., "A 40-Gb/s Decision Circuit in 90-nm CMOS", Proceedings of the 32nd European Solid-Sate Circuits Conference, vol. 32, pp. 512-515, Sep. 2006.

Okaniwa et al., "A 40-Gb/s CMOS clocked comparator with bandwidth modulation technique", IEEE Journal of Solid-Sate Circuits Conference, vol. 40, pp. 1680-1687, Aug. 2005.

Poulton et al., "A 14-mW 6.25-Gb/s Transceiver in 90-nm CMOS", IEEE Journal of Solid-Sate Circuits Conference, vol. 42, pp. 2745-2755, Dec. 2007.

(AESD) Azita Ememi-Neyestanak et al., "A 6.0-mW 10.0-Gb/s Receiver With Switched-Capacitor Summation DFE"; Apr. 2007; pp. 889-896, IEEE Journal of Solid-State Circuits, vol. 42, No. 4.

B. Leibowitz, J. Kizer, H. Lee, F. Chen, A. Ho, M. Jeeradit, A. Bansal, T. Greer, S. Li, R. Farjadrad, W. Stonecypher, Y. Frans, B. Daly, F. Heaton, B.W. Garlepp, C.W. Werner, N. Nguyen, V. Stojanovic, J L. Zerbe, "A 7.5Gb/s 10-tap DFE Receiver with First Tap Partial Response, Spectrally Gated Adaptation, and 2nd-Order Data Filtered CDR," ISSCC Dig. Tech Papers, pp. 228-229, Feb. 2007.

T. Beukema et al, "A 6.4Gb/s CMOS SerDes Core with Feed-Foward and Decision-Feedback Equalization," IEEE Journal of Solid-State Circuits, vol. 40, No. 12, Dec. 2005, pp. 2633-2645.

J.F. Bulzacchelli, M. Meghelli, S.V. Rylov, W. Rhee, A.. Rylyakov, H.A. Ainspan, B.D. Parker, M. P. Beakes, A. Chung, T.J. Beukema, P.K. Pepelijugoski, L. Shan, Y.H. Kwark, S. Gowada, and D.J. Friedman, "A 10-Gb/s 5-tap DFE/4-tap FFE transceiver in 90-nm CMOS technology," IEEE Journal of Solid-State Circuits, vol. 41, pp. 2885-2900, Dec. 2006.

K. J. Wong, A. Rylyakov, and C. K. Ken Yang, "A 5-mW 6-Gb/s quarter-rate sampling receiver with a 2-tap DFE using soft decisions," Symp. VLSI Circuits Dig. , pp. 190-191, Jun. 2006.

A. Garg, A. C. Carusone, and S. P. Voinigescu, "A 1-tap 40-Gb/s look-ahead decision feedback equalizer in 0.18-μm SiGe BiCMOS technology," IEEE Journal of Solid-State Circuits, vol. 41, pp. 2224-2232, Oct. 2006.

J. Lee, B. Razavi, "A 40-Gb/s clock and data recovery circuit in 0.18-μm CMOS technology," IEEE Journal of Solid-State Circuits, vol. 38, pp. 2182-2190, Dec. 2003.

C. Kromer, G. Sialm, C. Menolfi, M. Schmatz, F. Ellinger, H. Jackel "A 25Gb/s CDR in 90nm CMOS for High-Density Interconnects," ISSCC Dig. Tech Papers, pp. 326-327, Feb. 2006.

D. Kucharski, K. Kornegay, "2.5 V 43-45 Gb/s CDR Circuit and 55 Gb/s PRBS Generator in SiGe Using a Low-Voltage Logic Family," IEEE Journal of Solid-State Circuits, vol. 41, pp. 2154-2165, Sep. 2006.

N. Nedovic, N. Tzartznis, H. Tamura, F. Rotella, M. Wiklund, J. Ogawa, W. Walker, "A 40-44Gb/s 3x Oversampling CMOS CDR/1:16 DEMUX," ISSCC Dig. Tech Papers, pp. 224-225, Feb. 2007.

M. Lee, W. Dally, P. Chiang, "Low-power area-efficient high-speed I/O circuit techniques," IEEE Journal of Solid-State Circuits, vol. 35, pp. 1591-1599, Nov. 2000.

J. Kim, M. Horowitz, "Adaptive supply serial links with sub-1-V operation and per-pin clock recovery," IEEE Journal of Solid-State Circuits, vol. 37, pp. 1403-1413, Nov. 2002.

K. J. Wong, H. Hatamkhani, M. Mansuri, and C. K. Ken Yang, "A 27-mW 3.6-Gb/2 I/O transceiver," IEEE Journal of Solid-State Circuits, vol. 39, pp. 602-612, Apr. 2004.

B. Casper, J. Jaussi, F. O'Mahony, M. Mansuri, K. Canagasaby, J. Kennedy, E. Yueng, and R. Mooney, "A 20Gb/s forwarded clock transceiver in 90nm CMOS," IEEE International Solid-State Circuits Conference, vol. XLIX, pp. 90-91, Feb. 2006.

R. Gonzalez, B. Gordon, and M. A. Horowitz, "Supply and threshold voltage scaling for low power CMOS," IEEE Journal of Solid-State Circuits, vol. 32, pp. 1210-1216, Aug. 1997.

* cited by examiner

METHOD AND SYSTEM FOR LOW-POWER INTEGRATING DECISION FEEDBACK EQUALIZER WITH FAST SWITCHED-CAPACITOR FEED FORWARD PATH

BACKGROUND OF THE INVENTION

1. Field of the Invention

The present invention relates generally to decision feedback equalizers and in particular to low-power decision feedback equalizers for communication systems.

2. Background Information

A decision feedback equalizer (DFE) utilizes decisions on data symbols that have been previously transmitted to reduce or eliminate intersymbol interference (ISI) that may be caused by such previously transmitted data symbols.

Building decision feedback equalizers at very high data rates (e.g., greater than 15 Gbit/s) has been a challenge due to the stringent timing requirements in the requisite feedback loops. One approach has been to use multi-tap speculation, leading to sampling the data signal with a number of $2^n$ samplers at given voltage thresholds, and later determining which of the samples to use dependent on the previous symbols. However, to achieve low power, the number of speculated taps n has to be kept as small as possible since complexity grows as $2^n$.

SUMMARY OF THE INVENTION

The invention provides a method and system for decision feedback equalization for digital transmission systems. One embodiment involves low-power integrating decision feedback equalization with fast switched-capacitor feed forward path, using decisions on previously transmitted data symbols to suppress the intersymbol interference (ISI) due to past data symbols.

A preferred implementation includes performing current-integrating decision feedback equalization at low-power employing a fast capacitively coupled feed-forward path at the output of a current-integrating buffer and inducing voltage changes by charge redistribution via coupled switching capacitors; performing a voltage digital-to-analog conversation to determine a feedback coefficient as a coupling voltage; resetting switches to a pre-charge coupling voltage in the buffers to eliminate residual ISI caused by signal history, thereby achieving current integrating buffering with switched-capacitor feedback during the integration; and triggering the capacitive switches by previous symbols.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for decision feedback equalization (DFE) for digital transmission systems. One embodiment involves low-power integrating decision feedback equalization with fast switched-capacitor paths, using decisions on previously transmitted data symbols to suppress the intersymbol interference (ISI) due to past data symbols.

A preferred implementation includes performing current-integrating decision feedback equalization at low-power, employing a fast capacitively coupled feed-forward path at the output of a current-integrating buffer and inducing voltage changes by charge redistribution via coupled switching capacitors; performing a voltage digital-to-analog conversion to determine a feedback coefficient as a coupling voltage; resetting switches to a pre-charge coupling voltage in the buffers to eliminate residual ISI caused by signal history, thereby achieving current integrating buffering with switched-capacitor feedback during the integration; and triggering the capacitive switches by previous symbols.

A current-integrating DFE according to the invention is low-power with a fast capacitively coupled feed-forward path. A current-integrating DFE buffer with a capacitively coupled fast feed-forward path allows use of a smaller number of speculated taps n. For example, in the case of a 25 Gbit/s receiver, speculated taps n can be reduced from 4 to 2, which reduces the receiver complexity from 16 to 4 latches per clock slice. Hence less power is consumed.

For a quarter-rate receiver, meaning that the receiver clock frequency is ¼ of the data rate, the current-integrating DFE buffer with a capacitively coupled fast feed-forward does not lose 2 unit intervals of timing, which is a problem with conventional designs which require the feedback data to be stable already before the integration starts (hence, the time corresponding to two symbols (i.e., 2 unit intervals, or UIs) is lost in conventional designs).

Figure 1:
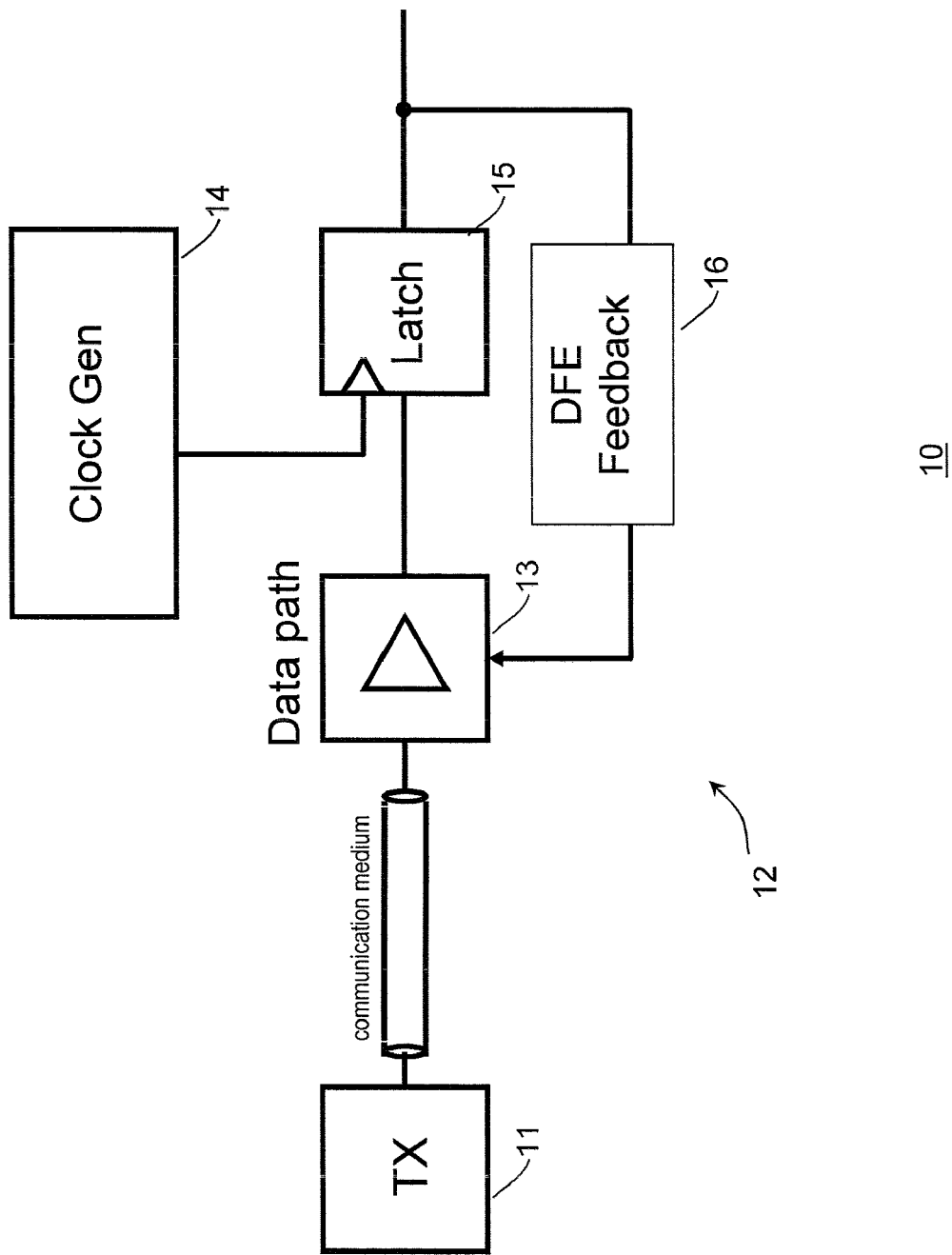
FIG. 1 shows a functional block diagram of an example communication system embodying aspects of the invention.

FIG. 1 shows a communication system 10 including a transmitter (Tx) 11 and receiver (Rx) 12, implementing an embodiment of the invention. In the Rx 12, a data path module 13 provides functionality for input data, buffering, amplification and signal addition. A clock generation module 14 generates clock signals for clock and data recovery (CDR). A latch module 15 provides a sampling latch on received signals. The latch provides a sampling function, which is defined by the shape of its sampling window (this ultimately defines the achievable time resolution of the sampler). Further, the latch provides regenerative amplification, defined by its regeneration time constant τ (smaller values for τ correspond to higher gain). A DFE feedback module 16 includes a current-integrating DFE system according to the invention.

Figure 2A:
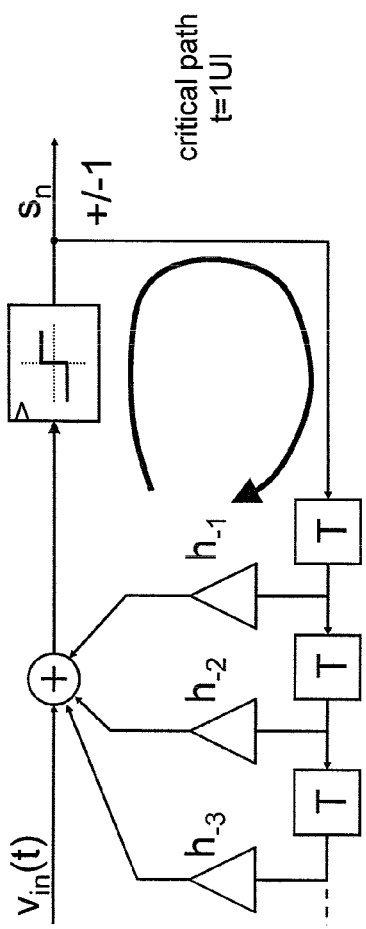
FIG. 2A shows a direct DFE and FIG. 2B shows a speculative DFE with one tap speculative.
Figure 2B:
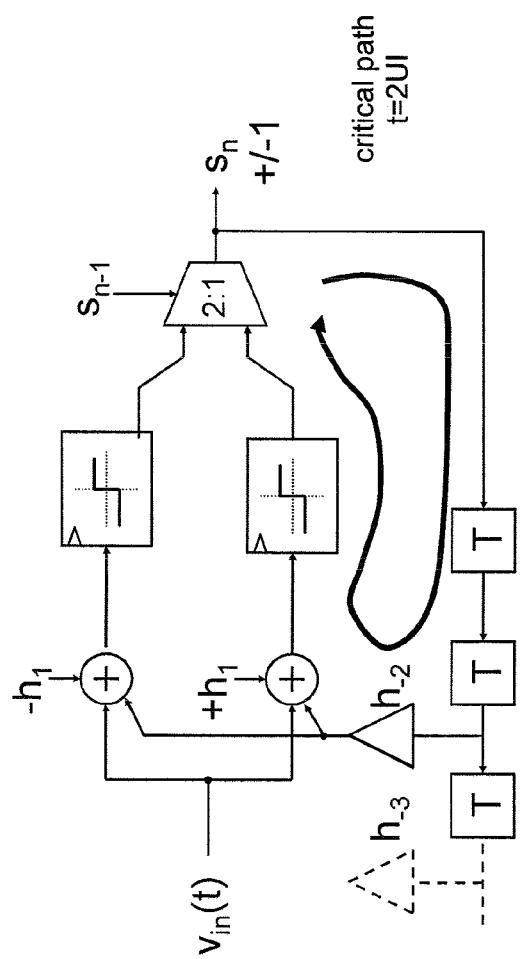

A DFE data path can be implemented as either a direct DFE (FIG. 2A) or a speculative DFE (FIG. 2B, DFE with one tap speculative). In a DFE, the received data bits are multiplied by coefficient values and are fed back to the input at a summing node. In FIG. 2A, during a critical path through the DFE (1

UI), the latch must amplify the data, and the data must run through a summer and buffer in the DFE before the latch. Referring to FIG. 2B, the critical path timing margin can be multiplied by two (2UI) if one bit of speculation is used. Two samples are taken at the same time, and one of these two samples is then selected in the digital domain. The critical path is the path for the second DFE coefficient.

Figure 3:
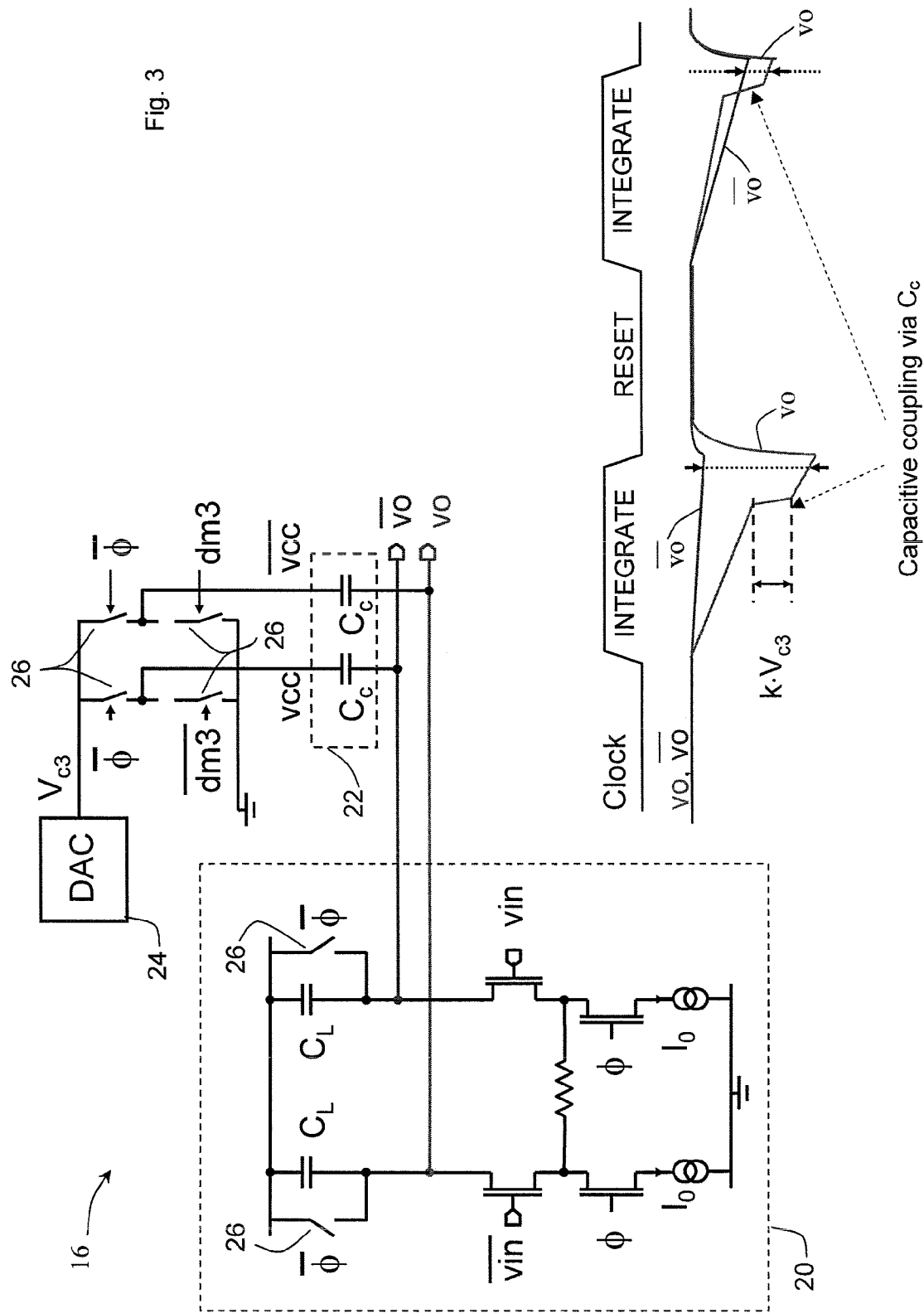
FIG. 3 shows an embodiment of a DFE with integrating buffer and fast capacitive feedback, according to the invention.

FIG. 3 shows details of an implementation of the current-integrating DFE system 16 having a current-integrating buffer with a capacitively coupled fast feed-forward path, according to an embodiment of the invention. The system 16 combines current-integrating decision feedback equalization with fast switched capacitor feedback.

The system 16 includes a current-integrating buffer 20 which at the output is connected to a capacitive charge distribution circuit 22 providing fast feedback. The system 16 further includes a voltage digital-to-analog converter (DAC) 24 that specifies a feedback coefficient and reset switches 26 to pre-charge a coupling voltage for the circuit 22, wherein the reset switches 26 are triggered when the sampling clock 4 is low.

In a sampled sub-rate system of rate N, the bandwidth limitation in the buffer causes ISI for symbols k times N. The bandwidth requirements can be greatly relaxed by introducing a reset switch. This erases the residual ISI caused by the signal history. Hence, having a sampled data path with a reset-able buffer allows use of incomplete settling in the buffer. As such, the load resistance can be made higher, which enables lowering the current at the same gain. An infinite load resistance and a current-integrating buffer consume the smallest amount of power at a given gain and load capacitance CL. With an integrating buffer a higher load capacitance can be driven with lower power at the same noise level, allowing lower power consumption in the decision feedback equalizer.

In the current-integrating DFE, power consumption is reduced by eliminating the current through the load resistance of the buffer and hence using a current-integrating buffer. When a Clock signal $\phi$ is low, the circuit is reset. When the Clock signal goes high, the input voltage is integrated on the load capacitance. The contribution of the different DFE taps is added on the same output node. Also, the offset voltage of the circuit and the following latch can be corrected by adding an offset current. Such a current-integrating DFE achieves low power. In prior art implementations of a current-integrating DFE the DFE feedback module 16 however requires that the previous bit decision has to be stable before the integration starts. Using the current-integrating DFE together with the fast capacitively-coupled feed-forward path removes this requirement and hence considerably relaxed the timing requirements in the DFE feedback loop.

In a DFE system with 2 speculative taps the voltage DAC controls the magnitude of the third DFE coefficient, which is the most timing-critical tap. In general, in a DFE with n speculative taps, the DAC controls the magnitude of the $n+1^{th}$ coefficient. Additional DACs 24 and capacitive coupling caps 22 can be added to implement fast DFE feedback for additional coefficients.

During the reset phase the voltages vcc and $\overline{vcc}$ are pre-charged to the voltage vc3 from the voltage DAC. When the symbol decision dm3, $\overline{dm3}$, is ready, one of the nodes (vcc and $\overline{vcc}$) is connected to ground (GND) via corresponding switches 26. This then leads to an instantaneous change in the output voltage vo, $\overline{vo}$, of the current-integrating buffer (integrator) 20. FIG. 3 also shows corresponding waveforms for Clock and vo, $\overline{vo}$ signals, illustrating integration and reset periods.

Figure 4:
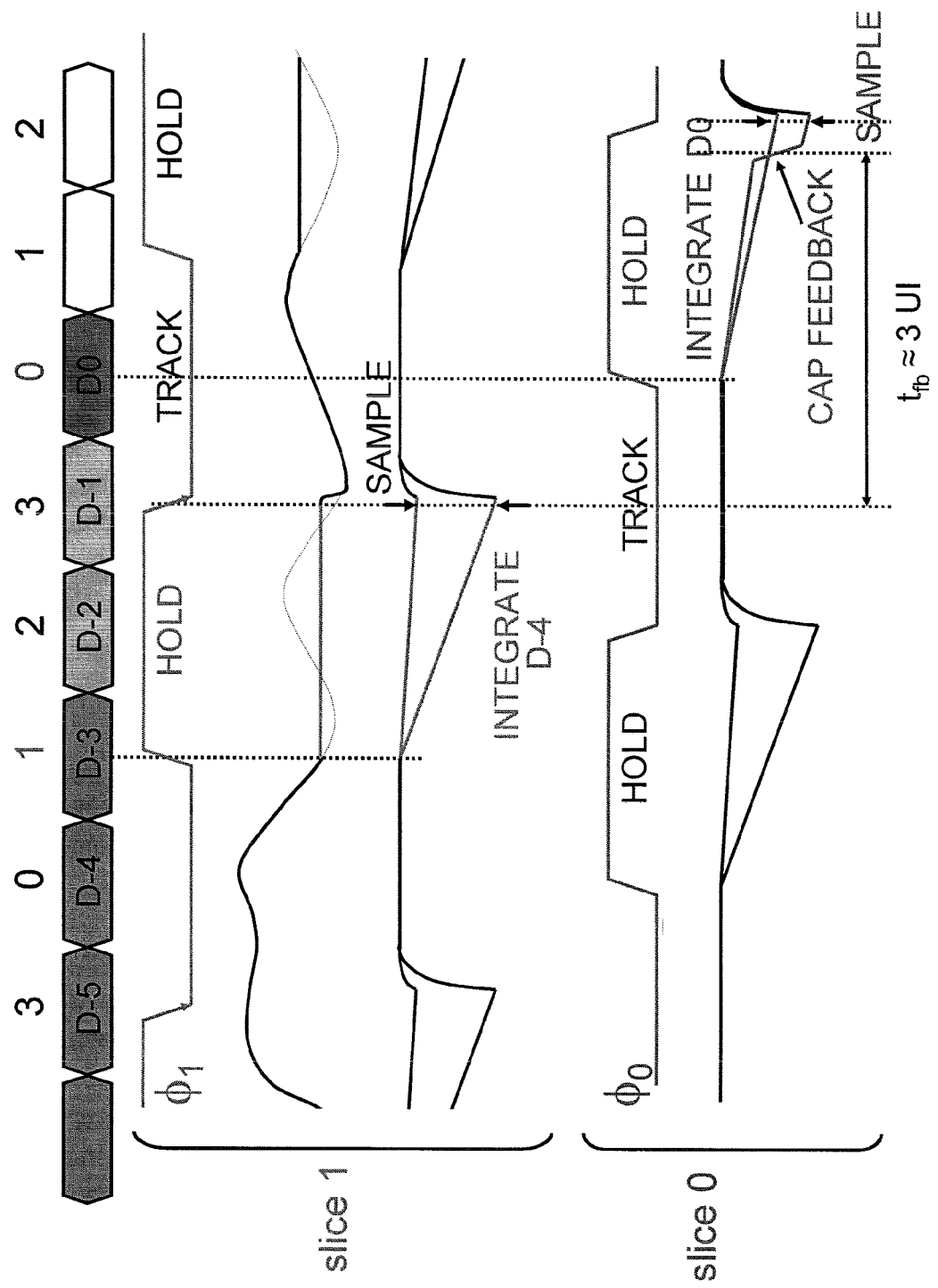
FIG. 4 shows a timing diagram of the embodiment in FIG. 3.

FIG. 4 shows example timing for 2-tap speculation with fast capacitive feedback path in the system 10. In the example system, a data rate of 25 Gb/s is assumed to be received in a receiver running at quarter rate. Feedback time, $t_{fb}$, can be represented as:

$t_{fb}$=120 ps, $t_{fb}$=A mux+4:1 mux+buffer+RS flip-flop.

This can be achieved using a CMOS frontend (which reduces power consumption).

For 14 to 30 Gbps, 2 to 3 tap of speculative feedback can be combined with an integrating buffer with fast capacitive feedback approach according to the invention. For data rates over 30 Gbps, 4 to 5 taps of speculation can be achieved with variable level analog-to-digital converter (ADC).

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of decision feedback equalization for digital transmission systems, using decisions on previously transmitted data symbols to suppress intersymbol interference (ISI) due to past data symbols, comprising:

performing current-integrating decision feedback equalization at low-power, employing a fast capacitively coupled feed-forward path, including coupled switching capacitors, at the output of a current integrating buffer providing integration nodes, and inducing voltage changes by charge redistribution via the coupled switching capacitors;

employing a digital-to-analog converter (DAC) via switches at coupling nodes to the coupled switching capacitors, for performing a voltage digital-to-analog conversion to determine a feedback coefficient as a coupling voltage;

performing pre-charging of the coupled switching capacitors to a defined analog voltage value by resetting the switches to a pre-charge the coupling voltage to inject a defined charge on the integration nodes, and providing a well-controlled voltage drop at the integration nodes proportional to a feedback coefficient by grounding one of the coupling nodes via one of the switches in the buffers to eliminate thereby eliminating residual ISI caused by signal history, thereby and achieving current integrating buffering with switched-capacitor feedback during the integration and wherein said resetting involves triggering the capacitive switches by previous symbols.

* * * * *